United States Patent [19]

Dolegowski

[11] Patent Number: 5,271,121
[45] Date of Patent: Dec. 21, 1993

[54] PNEUMATIC WINDSHIELD WIPER WITH SENSOR CONTROLLED MOTOR

[75] Inventor: Arthur R. Dolegowski, Oregon City, Oreg.

[73] Assignee: Maverick International, Inc., Portland, Oreg.

[21] Appl. No.: 72,857

[22] Filed: Jun. 7, 1993

Related U.S. Application Data

[63] Continuation of Ser. No. 822,683, Jan. 21, 1992, abandoned.

[51] Int. Cl.⁵ .............................. B60S 1/10; B60S 1/26
[52] U.S. Cl. .............................. 15/250.3; 15/250.13; 15/250.12; 318/DIG. 2; 91/275
[58] Field of Search .......... 15/250.30, 250.13, 250.12, 15/250.16; 91/275, 459; 92/5 R; 318/443, 444, DIG. 2; 74/89.11, 89.12

[56] References Cited

U.S. PATENT DOCUMENTS

| 2,632,196 | 3/1953 | Rappl | 15/250.3 |
|---|---|---|---|
| 2,950,599 | 8/1960 | Burt | 15/250.12 |
| 3,114,168 | 12/1963 | Taylor | 15/250.3 |
| 3,128,594 | 4/1964 | Schmitz | 60/10.5 |
| 3,153,985 | 10/1964 | Riley et al. | 91/264 |
| 3,470,915 | 10/1969 | Bitzer et al. | 138/43 |
| 4,158,159 | 6/1979 | Orris et al. | 318/443 |
| 4,176,586 | 12/1979 | Stoll et al. | 91/275 |
| 4,251,898 | 2/1981 | Reichard | 15/250.1 |
| 4,336,482 | 6/1982 | Goertler et al. | 318/443 |
| 4,355,270 | 10/1982 | Cook et al. | 318/443 |
| 4,431,954 | 2/1984 | Carpenter et al. | 318/443 |
| 4,609,045 | 9/1986 | Rogers | 91/275 |
| 4,628,499 | 12/1986 | Hammett | 91/361 |
| 4,670,695 | 6/1987 | Licata et al. | 318/443 |
| 4,705,997 | 11/1987 | Juzswik | 318/341 |
| 4,778,356 | 10/1988 | Hicks | 91/275 |
| 4,846,048 | 7/1989 | Hvilsted et al. | 91/DIG. 4 |
| 4,866,357 | 9/1989 | Miller et al. | 318/443 |
| 4,900,995 | 2/1990 | Wainwright | 318/443 |
| 4,914,916 | 4/1990 | Leigh-Monstevens et al. | 60/534 |

FOREIGN PATENT DOCUMENTS

| 489474 | 1/1953 | Canada | 15/250.3 |
|---|---|---|---|
| 570336 | 2/1933 | Fed. Rep. of Germany | 15/250.3 |
| 912711 | 5/1946 | France | 15/250.3 |
| 0796016 | 1/1981 | U.S.S.R. | 15/250.3 |

Primary Examiner—Stephen F. Gerrity
Assistant Examiner—Gary K. Graham
Attorney, Agent, or Firm—Eugene D. Farley

[57] ABSTRACT

A pneumatic windshield wiper includes a compressed air motor provided with a piston which mounts a pair of actuator vanes one of which functions with a fixed electric sensor on the motor housing to establish the "park" position of the wiper blade. The other sensor actuator vane is adjustable along the length of the piston rod and functions with the sensor to establish the extended, adjustable position of the wiper blade. The sensor is included in an electronic circuit which controls operation of an electric solenoid valve and hence delivery of compressed air to the wiper motor.

7 Claims, 4 Drawing Sheets

PNEUMATIC WINDSHIELD WIPER WITH SENSOR CONTROLLED MOTOR

This application is a continuation of application Ser. No. 07/822,683, filed Jan. 21, 1992 now abandoned.

BACKGROUND OF THE INVENTION

This invention relates to windshield wipers for vehicles, and more particularly to a windshield wiper having a novel pneumatic drive motor and electronic control.

The windshield wiper of this invention is of particular utility for trucks, buses, off-the-road vehicles, locomotives, boats, ships and like vehicles that are provided with a source of compressed air. Windshield wipers of this type have been provided heretofore. However, they are characterized generally by having pneumatic motors which are provided with mechanical stops for controlling the length of stroke, and valving and switching ports for controlling the direction of air to the motor. The mechanical stops contribute adversely to limited operating life of the motor, and they also necessitate customizing to achieve different wiper blade sweep dimensions. The valving and ports are sensitive to contaminants in the compressed air supply, which is a chief cause of malfunctions.

SUMMARY OF THE INVENTION

The windshield wiper of this invention incorporates a fluid pressure motor in which the length of motor stroke is controlled by electronic sensor elements movable with the moving component of the motor and arranged to activate an electric circuit which controls the movement of a wiper blade over a windshield.

It is the principal objective of this invention to overcome the aforementioned limitations and disadvantages of prior pneumatic windshield wipers.

Another objective of this invention is to provide a windshield wiper of the class described in which a compressed air drive motor is controlled by an electronic circuit from a remote position.

Still another object of this invention is the provision of a windshield wiper of the class described in which the magnitude of wiper blade sweep is variable infinitely over a relatively large range.

A further objective of this invention is the provision of a windshield wiper of the class described in which the movement of a wiper blade from a parked position is reversible between right to left and left to right position.

A still further object of this invention is to provide a windshield wiper of the class described in which the speed of movement of the wiper blade is made variable by controlling the rate of exhaust of compressed air from the motor.

A further object of this invention is the provision of a windshield wiper of the class described which may include a plurality of time delays for intermittent operation of the wiper blade.

Another objective of this invention is the provision of a windshield wiper of the class described which is of simplified construction for economical manufacture, maintenance and repair.

The foregoing and other objects and advantages of this invention will appear from the following detailed description, taken in connection with the accompanying drawings of a preferred embodiment.

DESCRIPTION OF THE PREFERRED EMBODIMENT

Figure 1:
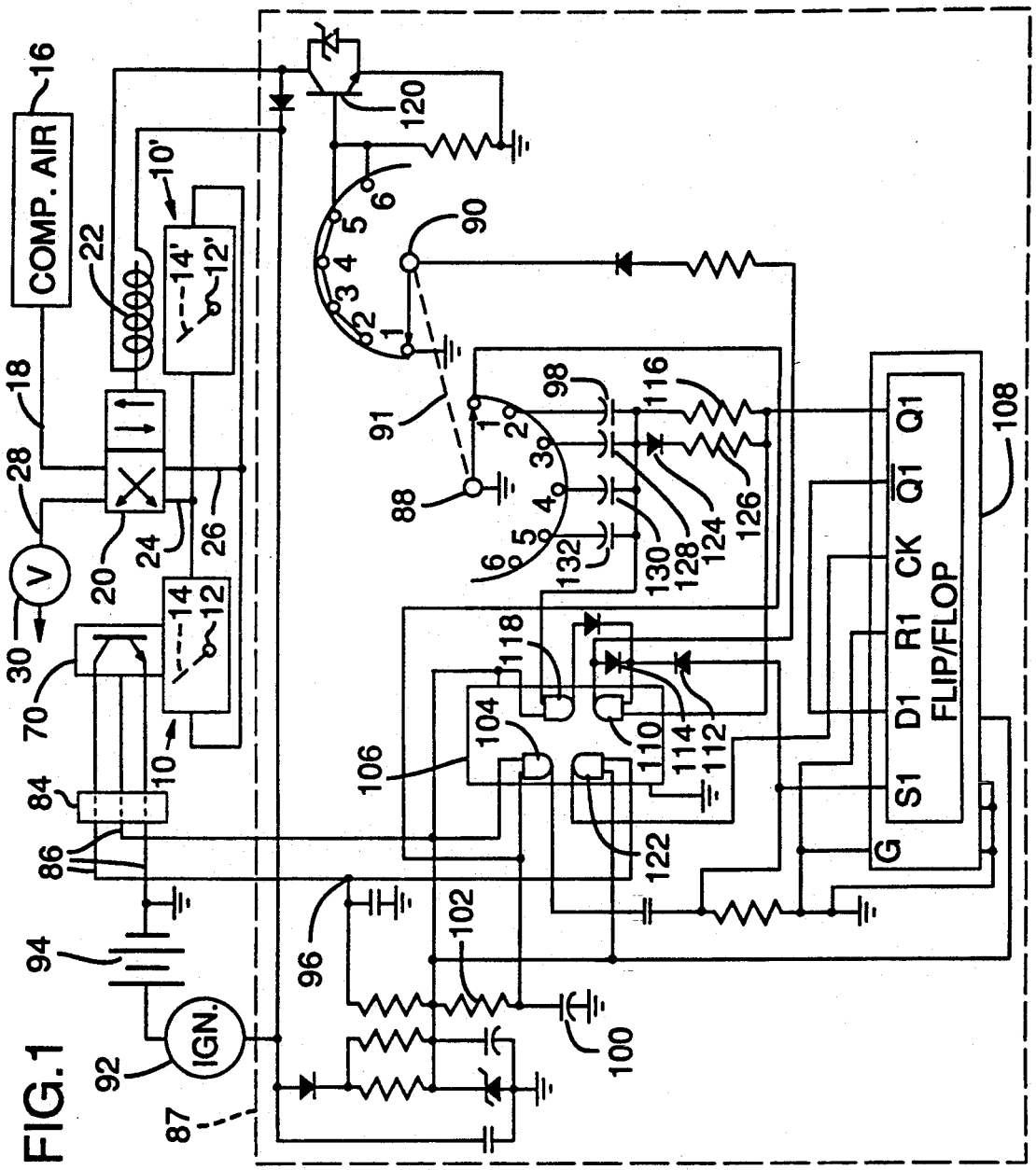
FIG. 1 is a schematic diagram of a pneumatic windshield wiper drive system and electronic control circuit embodying the features of this invention.

The assembly of components making up the pneumatic windshield wiper of this invention is shown schematically in FIG. 1. A pneumatic wiper blade drive motor 10 is provided with an output shaft 12 for operative connection to a wiper blade 14 which is to be reciprocated across a windshield between a storage or "park" position and a fully extended position at the opposite end of the wiper blade sweep across the windshield. A fluid pressure supply, preferably the source 16 of compressed air provided for the air supply system of the vehicle, has a delivery conduit 18 leading to a directional control valve 20 operated by an electric solenoid 22. Compressed air tubes 24 and 2 extend from the side of the directional control valve opposite conduit 18 and communicate with the opposite ends of the motor 10. An exhaust conduit 28 communicates with the return ports of the directional control valve 20 and communicates with the atmosphere through an exhaust speed control valve 30.

Figure 2:
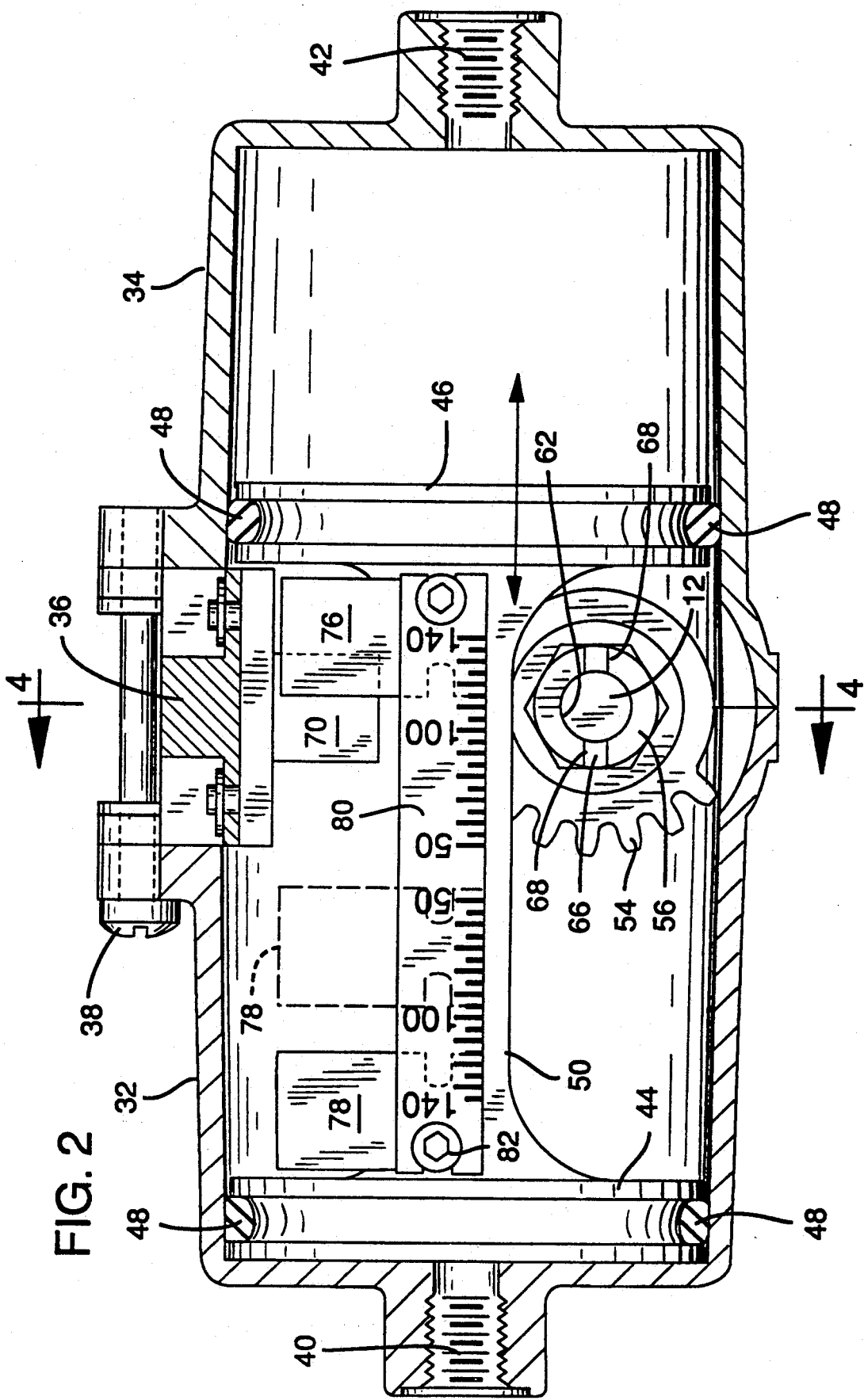
FIG. 2 is a longitudinal sectional view of a pneumatic drive motor forming a part of this invention, the motor piston being shown in the wiper blade "park" position.
Figure 3:
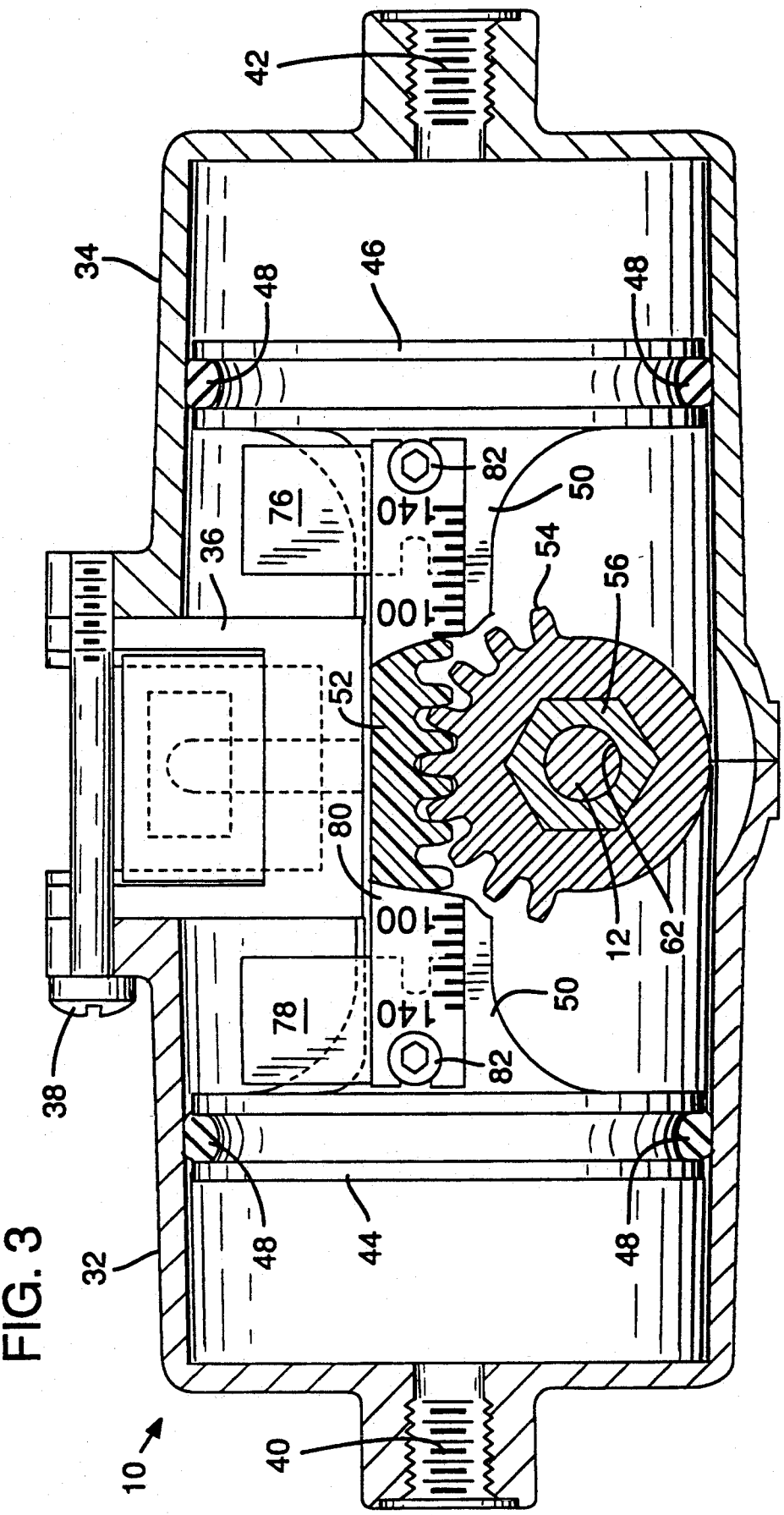
FIG. 3 is a longitudinal sectional view of the pneumatic drive motor of FIG. 2 showing the motor piston in a selected position of wiper blade sweep extension.
Figure 4:
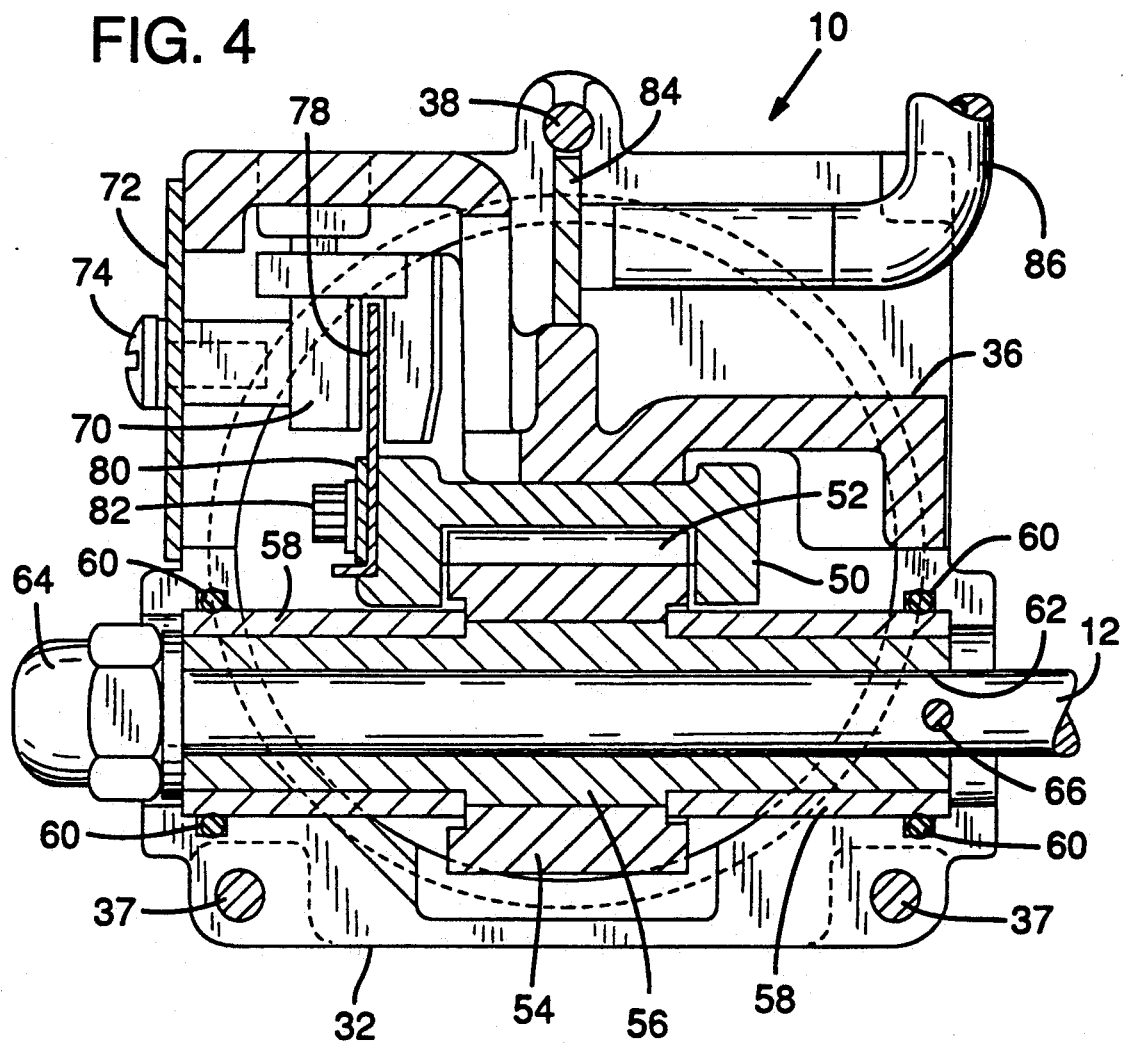
FIG. 4 is a transverse sectional view of the drive motor taken on the line 4—4 in FIG. 2.

Referring now more specifically to FIGS. 2, 3 and 4 of the drawings, the wiper blade drive motor includes a pair of longitudinal housing sections 32 and 34 and a centrally located sensor mounting block 36. These three components are secured together releasably by connector screws 37 and 38. Compressed air ports 40 and 42 are provided in the outer ends of the housing sections 32 and 34, respectively, for connection of the tubes 24 and 26, respectively.

Within the motor housing is a reciprocating piston member defined by longitudinally spaced piston heads 44 and 46, each provided with a sealing O-ring 48 and joined together by the elongated connector rod 50. The underside of the connector rod is configured as an elongated rack 52 which is engaged by a sector gear 54. The sector gear is secured to a hub 56 which is journaled in end bearings 58, rotation of which is restricted by O-rings 60.

The sector gear hub is provided with an axial bore 62 which removably receives the elongated wiper blade shaft 12. The shaft is secured in the hub by means of an acorn nut 64 at one end of the shaft and a lock pin 66 which extends through the shaft adjacent the opposite end of the hub and is engaged in notches 68 in the end of the hub. The wiper blade shaft thus is secured releasably against axial displacement but for rotation with the sector gear.

The sensor mounting block 36 mounts a sensor of the type that produces an electric signal when actuated. A wide variety of such sensors are available in such forms as optoelectronics in which light pulses are detected to establish positions and directions, proximity sensors, reed switches, Hall effect sensors and others. In the preferred embodiment illustrated, a Hall effect transducer 70 is utilized. The transducer is accessible to an opening in the housing removably closed by cover 72 which is secured to the housing by screws 74.

The sensor 70 is actuated by means of magnetically susceptible elements. In the embodiment illustrated, such elements are in the form of vanes 76 and 78 spaced apart along the length of the piston rod 50. In the illustrations of FIGS. 2 and 3, vane 76 is shown in FIG. 2 to be in position adjacent the sensor 70 to actuate the sensor and effect stopping of the piston at its extreme leftward position of travel. This position defines the "park" position of the wiper blade. In FIG. 3 the sensor vane 78 is shown to be displaced from the sensor 70. In this position the piston is at an intermediate position of its travel toward the right. When the vane 78 reaches the position adjacent the sensor 70, the sensor will be actuated to define the limit of travel of the piston from the "park" position of FIG. 2 to the position of maximum extension of the wiper blade at the completion of its sweep across the windshield.

Means is provided for securing the vane 78 in various positions of adjustment along the piston rod. In this regard, it is to be noted in FIG. 3 that the vane 78 shown in full lines is secured in a position in alignment with the scale graduation mark "140". This graduation mark identifies the arc of 140 degrees through which the wiper blade will oscillate as a result of corresponding arcuate oscillation of the sector gear 54 and shaft 12.

FIG. 2 of the drawings shows in broken line an adjusted position for vane 78 in alignment with graduation mark "70", which provides for the wiper blade sweep of 70 degrees. Accordingly, in the illustrated embodiment the vane 78 may be adjusted to provide any desired arcuate sweep between 50 degrees and 140 degrees.

Adjustment of sensor blade 78 along the piston rod 50 is afforded by means of the sensor blade clamp bar 80 and screws 82 by which the vane 78 is secured between the clamp bar 80 and the confronting side surface of the piston rod 50.

It is to be noted that the clamp bar 80 is provided with two graduated scales that extend from the center toward the opposite ends of the clamp bar. It is by this means that the vanes 76 and 78 may be reversed to specific positions, to accommodate reversal of movement of the wiper blade from "park" position. This reversal also involves reversing the connections of the tubes 24 and 26 relative to the ports 40 and 42, respectively, as will be understood.

The sensor mounting block 36 also supports a printed circuit board 84 which provides a terminal connection by which cable 86 connects sensor 70 to the electronic circuit illustrated in FIG. 1.

Referring to FIG. 1 of the drawings, the electronic circuit is carried on a printed circuit board 87 which preferably is configured for mounting on the dash of a vehicle. The circuit board also supports a control selector switch 88 and a control connector switch 90 which are ganged together, as indicated by the broken line 91, for simultaneous operation by a control knob (not shown) mounted in convenient position on the dash. An ignition switch 92 functions to connect the vehicle battery 94 to the electrical circuit. The circuit now will be described in conjunction with a description of the principle of operation.

With the controller switches 88 and 90 set to the "off" position, which is the fully counter-clockwise position identified by number 1 on the switches, compressed air from the vehicle supply 16 is ported through the normally open port of the solenoid valve 20, thence through tube 24 and port 42 to the right end 46 of the wiper motor piston. Air pressure thus drives the piston to the "park" position (FIG. 2) at the far left end of the housing. Sensor actuator vane 76 registers with the sensor 70 and activates the latter to produce a logical high signal at the signal input 96 of the controller module.

By now turning the controller module switches 88 and 90 one step clockwise to the number 2 positions on the switches, capacitor 98 is connected to ground and capacitor 100 is removed from ground, allowing it to charge through resistor 102. Capacitor 100 is connected to "AND" gate 104 of the integrated circuit 106. A preferred integrated circuit is identified as Model CD4081. When capacitor 100 is charged, the output of gate 104 goes high, providing a set pulse to set pulse input S1 of the flip/flop integrated circuit 108. A preferred integrated circuit is Model No. CD4013.

The set pulse sets the output Q1 high and also toggles the input of "AND" gate 110 high through diode 112. This establishes a condition for the output of "AND" gate 110 to go high and be latched on by diode 114.

With the output Q1 of the integrated circuit 108 set high, capacitor 98 is charged through resistor 116. When capacitor 98 is charged, a condition exists on the "AND" gate 118 of integrated circuit 106 for an output high, and therefore the "AND" gate 110 of integrated circuit 106 goes high. This output is connected through the control connector switch 90 (which is at the number 2 position) to transistor 120. The transistor thus turns on and activates the air control solenoid 22. Activation of the solenoid switches the control valve 20 to the alternate position from the position illustrated in FIG. 1 and ports compressed air to the other end 44 of the air wiper motor piston. As sensor vane 76 moves away from the sensor 70, a logical low is established at the control module signal input 96.

Sensor actuator vane 78 is set to provide an indication of piston travel and corresponding output shaft angle, as explained hereinbefore. When the vane 78 reaches the position sensor 70, a logical high is sent to the "AND" gate 122 of integrated circuit 106 and therefore a logical high from gate 122 is sent to the clock input CK of integrated circuit 108. The clock pulse causes the output Q1 of integrated circuit 108 to go low, causing capacitor 98 to discharge through diode 124 and resistor 126. The output of "AND" gate 110 of integrated circuit 106 is caused to go low, turning off the transistor 120 and also the directional valve solenoid 22. The solenoid valve 20 thus returns to its original position allowing air to be ported to the original end 44 of the wiper motor piston, driving the latter back to the "park" position.

As sensor vane 78 moves away from the sensor 70, a logical low is again present at the controller module signal input 96. When sensor vane 76 reaches the sensor 70, a logical high is once again established at the controller module signal input 96, causing the logical high described hereinbefore to occur at the clock input CK of integrated circuit 108. This causes output Q1 of integrated circuit 110 to go high. With the output Q1 high, capacitor 98 charges through resistor 116. When capacitor 98 is charged, a condition exists on "AND" gate 118 for an output high. Accordingly, the output of "AND" gate 110 goes high and is once again latched on through diode 114. The foregoing cycle is repeated.

Control selector switch 88 serves to select any one of the capacitors 98, 128, 130 or 132, respectively, to provide various time delays in the activation of transistor 120 and corresponding delays in initiating movement of the wiper blade from the parked position. Typical delays provided by the capacitors 128, 130 and 132 are 4, 10 and 20 seconds, respectively.

It will be apparent from the foregoing that various changes may be made in the size, shape, type, number and arrangement of parts described hereinbefore. For example, the wiper blade drive motor may be of the hydraulic type, although compressed air is the preferred source. The motor may be of the rotary type wherein a paddle type piston is driven rotationally rather than linearly as is the piston in the type illustrated. The sensor 70 and actuator vanes 76 and 78 may be located externally of the motor, for example adjacent the shaft 12. The directional control valve 20 may communicate the compressed air supply 16 with one or more drive motors, such as the second motor 10' shown in FIG. 1. The foregoing and other modifications and changes may be made, as desired, without departing from the spirit of this invention and the scope of the appended claims.

I claim:

1. A fluid pressure windshield wiper, comprising:
   a) a fluid pressure motor having a hollow elongated motor housing containing a piston movable linearly in opposite directions by selective application of fluid pressure to opposed surfaces of the piston, an elongated piston rod connected to the piston for movement therewith, electric solenoid valve means for communicating the opposite surfaces of the piston selectively with a source of fluid pressure for moving the piston and piston rod, an output shaft supported rotatably on the housing and coupled to the piston rod and rotationally oscillated with linear reciprocation of the piston, and means connecting a wiper blade operatively to the output shaft,
   b) sensor means operable upon actuation to produce an electric signal, said sensor means electrically coupled to the solenoid valve means,
   c) first sensor actuator means for actuating the sensor means to produce an electric signal which operates the solenoid valve means to apply fluid pressure to one surface of the motor piston to move the wiper blade to a "park" position,
   d) second sensor actuator means spaced from the first sensor actuating means for actuating the sensor means to produce an electric signal which operates the solenoid valve means to apply fluid pressure to the opposite surface of the motor piston to move the wiper blade to an extended wiper blade position displaced from the "park" position and defining the sweep of the wiper blade across the windshield, and
   e) means mounting one of said sensor means and both first and second sensor actuator means on the piston rod within the housing for movement with the motor piston and relative to the other of said sensor means and both first and second sensor actuator means which is mounted in and to the motor housing.

2. The fluid pressure windshield wiper of claim 1 wherein the second sensor actuator means is mounted for adjustment toward and away from the first sensor actuator means for adjusting the magnitude of wiper blade sweep.

3. The fluid pressure windshield wiper of claim 1 including electric signal delay means connecting the sensor means to the solenoid of the electric solenoid valve means to delay the electric signal from the sensor means to the solenoid which delays delay operation of the motor and movement of the wiper blade from the "park" position to the extended wiper blade position.

4. The fluid pressure windshield wiper of claim 1 wherein the sensor means is a Hall effect device and the first and second sensor actuator means are vanes of magnetically susceptible material positioned for actuating the Hall effect device.

5. The fluid pressure windshield wiper of claim 1 wherein the piston has two longitudinally spaced heads connected together by said elongated piston rod, fluid pressure coupling means is provided in the opposite ends of the housing for coupling with the fluid pressure source, the sensor means is mounted to the housing, and the first and second sensor actuator means are mounted on the piston rod.

6. The fluid pressure windshield wiper of claim 1 wherein:
   a) the piston has two longitudinally spaced heads connected together by said elongated piston rod, fluid pressure coupling means is provided in the opposite ends of the housing for coupling with the fluid pressure source, the sensor means is mounted to the housing, and the first and second sensor actuator means are mounted on the piston rod, and
   b) electric signal delay means connects the sensor means to the solenoid of the electric solenoid valve means to delay the electric signal from the sensor means to the solenoid which delays operation of the motor and movement of the wiper blade from the "park" position to the extended wiper blade position.

7. A fluid pressure windshield wiper, comprising:
   a) a fluid pressure motor having a housing, a piston having two longitudinally spaced heads connected together by an elongated piston rod, the piston being linearly movable in opposite directions within the housing by selective application of fluid pressure to the opposed surfaces of said spaced heads, electric solenoid valve means communicating the opposed surfaces of said spaced heads selectively with a source of fluid pressure, an output shaft supported rotatably on the housing and coupled to the piston rod to be oscillated thereby, and means connecting a wiper blade operatively to said output shaft,
   b) Hall effect sensor means mounted in and to the housing said sensor means operable upon actuation to produce an electric signal, said sensor means electronically coupled to the solenoid valve means,
   c) first sensor actuator means of magnetically susceptible material mounted on the piston rod for actuating the sensor means to produce an electric signal which operates the solenoid valve means to apply fluid pressure to one surface of the motor piston to move the wiper blade to a "park" position,
   d) second sensor actuator means of magnetically susceptible material mounted on the piston rod and spaced from the first sensor actuating means for actuating the sensor means to produce an electric signal which operates the solenoid valve means to apply fluid pressure to the opposite surface of the motor piston to move the wiper blade to an extended wiper blade position displaced from the "park" position and defining the sweep of the wiper blade across the windshield, and e) electric signal delay means connecting the sensor means to the solenoid of the electric solenoid valve means to delay the electric signal from the sensor means to the solenoid which delays operation of the motor and movement of the wiper blade from the "park" position to the extended wiper blade position.

* * * * *